(12) United States Patent
Hyon

(10) Patent No.: US 6,412,719 B1
(45) Date of Patent: Jul. 2, 2002

(54) DUAL-BEARING REEL HAVING MECHANISM FOR INDUCING FREE ROTATION OF SPOOL

(75) Inventor: KwangHo Hyon, KyongDi-Do (KR)

(73) Assignee: Toyo Engineering Co, Ltd., Kyongki-Do (KR)

( * ) Notice: Subject to any disclaimer, the term of this patent is extended or adjusted under 35 U.S.C. 154(b) by 0 days.

(21) Appl. No.: 09/651,176

(22) Filed: Aug. 30, 2000

(30) Foreign Application Priority Data

Sep. 2, 1999 (KR) .................................................. 37981

(51) Int. Cl.$^7$ .............................................. A01K 89/00
(52) U.S. Cl. ........................................ 242/260; 242/257
(58) Field of Search ................................ 242/249, 257, 242/259, 260, 261

(56) References Cited

U.S. PATENT DOCUMENTS

| | | | | | |
|---|---|---|---|---|---|
| 4,394,991 A | * | 7/1983 | Noda | ........................... | 242/261 |
| 5,193,763 A | * | 3/1993 | Sakaguchi | ................... | 242/261 |
| 5,205,511 A | * | 4/1993 | Morimoto | .................... | 242/261 |
| 5,613,646 A | * | 3/1997 | Miyazaki | .................... | 242/260 |
| 5,904,310 A | * | 5/1999 | Miyazaki | .................... | 242/259 |

* cited by examiner

*Primary Examiner*—Emmanuel M. Marcelo
(74) *Attorney, Agent, or Firm*—Notaro & Michalos P.C.

(57) ABSTRACT

A dual-bearing reel has a rotatable pinion with a gear train driven by a rotating handle, a spool rotatable in the direction of the rotating handle by transferring a rotational force from the pinion to a spool shaft. The pinion and spool shaft are made so that releasing the pinion from the spool shaft allows the spool to rotate freely.

3 Claims, 8 Drawing Sheets

DUAL-BEARING REEL HAVING MECHANISM FOR INDUCING FREE ROTATION OF SPOOL

BACKGROUND OF THE INVENTION

1. Field of the Invention

The present invention relates to a dual-bearing reel called as a bait casting reel, and more particularly to a dual-bearing reel including a mechanism for inducing free rotation of a spool.

2. Description of the Related Art

Dual-bearing reels are generally constructed in such a way that a pinion is rotated with a gear train driven in response to the rotation of a handle, and a spool is rotated in the winding direction by transferring the rotating force of the pinion to a spool shaft.

On using such a dual-bearing reel, in order to obtain a maximum effect of the casting, the spool is maintained in such a manner of that little friction force is applied to the spool. Specifically, during the casting, if the thumb-bar provided on a reel body is pushed down, the pinion is disengaged with the spool shaft, thereby allowing the spool shaft to freely rotate.

With the construction of the prior dual-bearing reel including a mechanism for inducing free rotation of a spool, although the pinion is released from the spool shaft, there is a friction between the inner periphery of the pinion and the outer periphery of the spool shaft, thereby causing the free rotation of the spool to be limited. Therefore, since an idle run of the spool is not smooth, the casting distance is reduced, and a noise is produced.

SUMMARY OF THE INVENTION

Accordingly, to solve the problems stated above, an object of the present invention is to provide a dual-bearing reel including a mechanism for inducing free rotation of a spool, which a friction between an inner periphery of a pinion and an outer periphery of a spool shaft is minimized in a state that the pinion is released from the spool shaft.

To achieve the above and other objects, according to one aspect of the present invention, there is provided with a dual-bearing reel including a pinion rotatable with a gear train driven in response to a rotation of a handle, and a spool rotatable in the winding direction by transferring a rotating force of the pinion to a spool shaft, in which the release of the pinion from the spool shaft causes the spool to rotate freely: wherein the spool shaft has a large diameter portion, a stepped portion, and a small diameter portion, with the small diameter portion being interposed between the large diameter portion and the small diameter; and wherein the pinion has an enlarged groove on inner periphery of a hole, the hole being received with the large diameter portion of the spool shaft; such that when the pinion is engaged to the spool shaft to transfer the rotating force to the spool shaft, the hole is in contact with the large diameter portion and the stepped portion of the spool shaft, and when the pinion is released from the spool shaft to idly rotate the spool shaft, the stepped portion of the spool shaft is positioned in the enlarged groove of the pinion.

According to other aspect of the present invention, there is provided with a dual-bearing reel including a pinion rotatable with a gear train driven in response to a rotation of a handle, and a spool rotatable in the winding direction by transferring a rotating force of the pinion to a spool shaft, in which the release-of the pinion from the spool shaft causes the spool to rotate freely: wherein the spool shaft has first and second stepped portions and a small diameter portion between the stepped portions; and wherein the pinion a groove for receiving the first stepped portion of the spool shaft, and a hole for supporting the second stepped portion; such that when the pinion is engaged to the spool shaft to transfer the rotational force to the spool shaft, the first and second stepped portions of the spool shaft are in contact with the groove and the hole the pinion, respectively, and when the pinion is released from the spool shaft to idly rotate the spool shaft, the second stepped portion of the spool shaft is positioned in the hole of the pinion.

The pinion has an enlarged groove such that the second stepped portion of the spool shaft is positioned in the hole of the pinion.

According to another aspect of the present invention, there is provided with a dual-bearing reel including a pinion rotatable with a gear train driven in response to a rotation of a handle, and a spool rotatable in the winding direction by transferring a rotating force of the pinion to a spool shaft, in which the release of the pinion from the spool shaft causes the spool to rotate freely: wherein the spool shaft has a large diameter portion, a stepped portion, and a small diameter portion, with the small diameter portion being interposed between the large diameter portion and the small diameter; and wherein the pinion has an enlarged groove on an inner surface of a hole, into which the large diameter portion and the stepped portion of the spool shaft are inserted, an annular boss on one side of a pin latching groove, and a protruded arm on the other side of the pin latching groove opposite to the annular boss, the protruded arm having a slanted surface on an outer edge thereof, such that when the pinion is released from the spool shaft, the annular boss of the pinion is inserted into a stepped portion of a cam plate, and the slanted surface of the protruded arm is the slanted surface of the protruded annular portion 3a formed on a side cover, thereby automatically centering the slanted surfaces arm.

According to still another aspect of the present invention, there is provided with a dual-bearing reel including a pinion rotatable with a gear train driven in response to a rotation of a handle, and a spool rotatable in the winding direction by transferring a rotating force of the pinion to a spool shaft, in which the release of the pinion from the spool shaft causes the spool to rotate freely: wherein the spool shaft has a large diameter portion, a stepped portion, and a small diameter portion, with the small diameter portion being interposed between the large diameter portion and the small diameter; and wherein the pinion has an enlarged groove on an inner surface of a hole, into which the large diameter portion and the stepped portion of the spool shaft are inserted, an annular boss on one side of a pin latching groove; such that when the pinion is released from the spool shaft, the annular boss of the pinion is inserted into a stepped portion of a cam plate and is supported thereby.

BRIEF DESCRIPTION OF THE DRAWINGS

The above objects, other features and advantages of the present invention will become more apparent by describing the preferred embodiment thereof with reference to the accompanying drawings, in which:

FIG. 1 is a cross-sectional view illustrating the assembled state of a dual-bearing reel according to the present invention.

DETAILED DESCRIPTION OF THE PREFERRED EMBODIMENT

The construction and operation of the present invention will be explained in detail with reference to the accompanying drawings.

Figure 3:
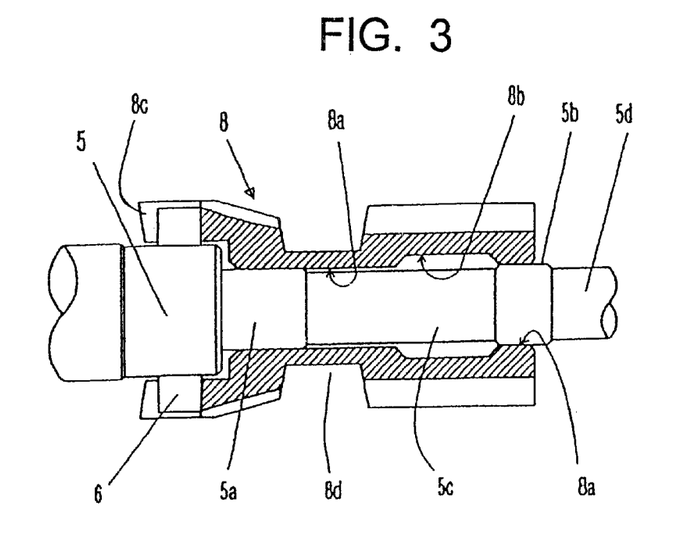
FIGS. 3 and 4 are enlarged views illustrating the state that a pinion is engaged to and released from a spool shaft, respectively.

As seen in FIG. 3, spool shaft 5 has a large diameter portion 5a and a stepped portion 5b. Small diameter portion 5c is interposed between the large diameter portion 5a and stepped portion 5b.

Figure 4:
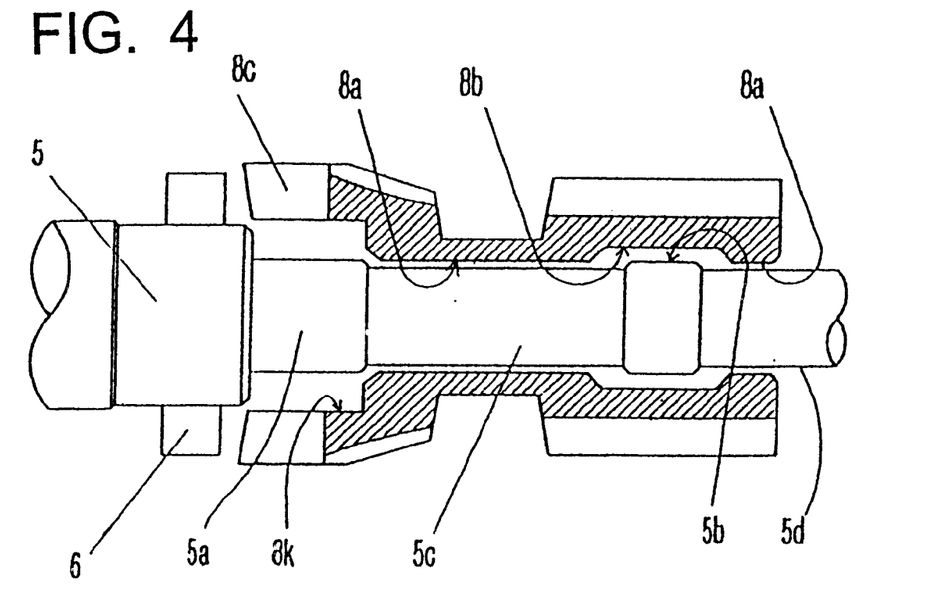
Figure 5:
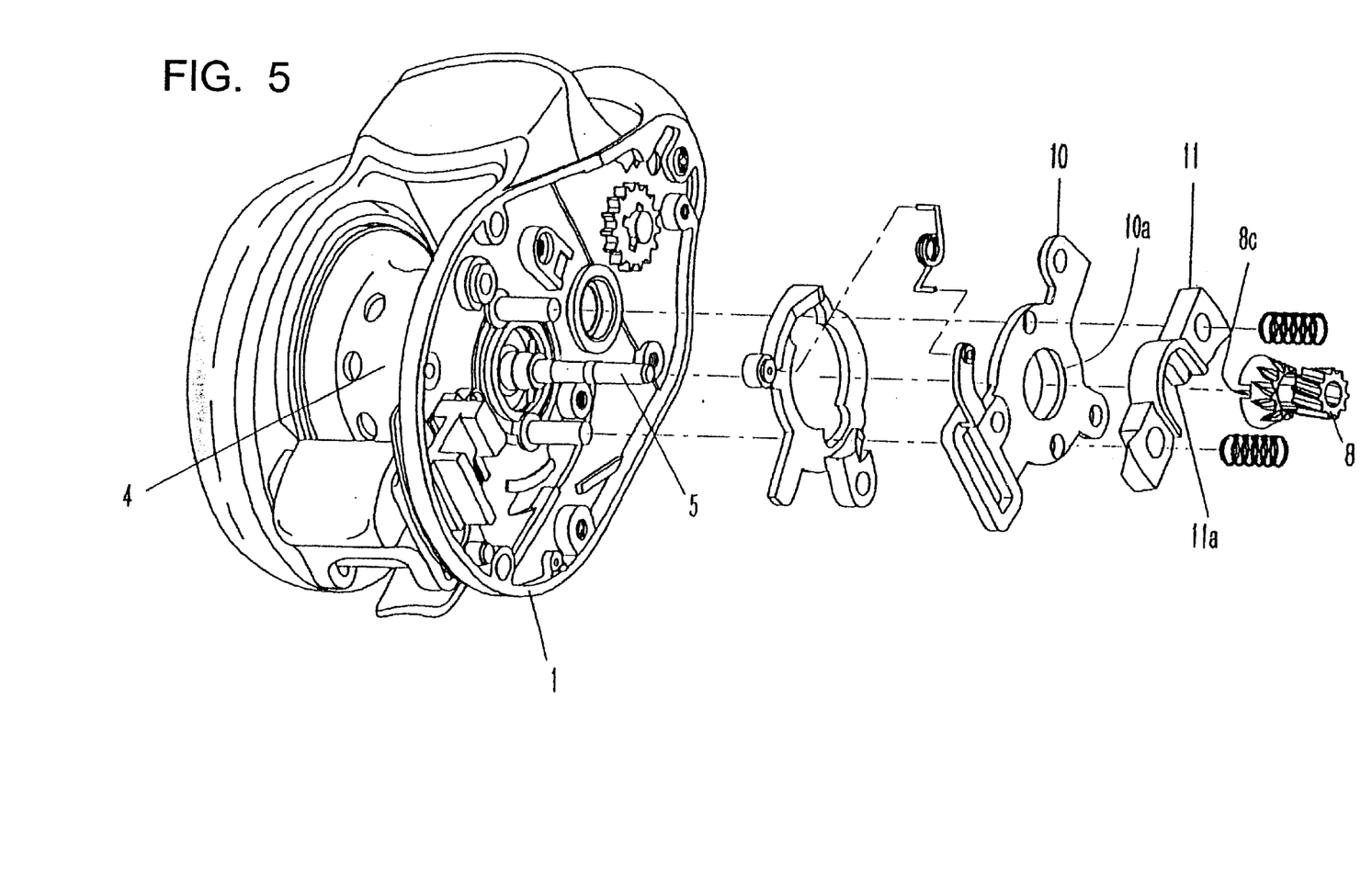
FIG. 5 is an exploded view illustrating the construction of a dual-bearing reel according to the present invention.

When a pinion 8 is engaged to the spool shaft 5, a hole 8a is in contact with the large diameter portion and the stepped portion 5b of the spool shaft. An end of an arm 5d extended from the stepped portion 5b is in contact with a washer 17 of a brake force controlling knob 16, and has a diameter same or smaller than that of the small diameter portion. When the pinion 8 is released from the spool shaft 5, the hole 8a of the pinion 8 does not intervene the spool shaft, and the stepped portion 5b of the spool shaft is positioned in an enlarged groove 8b of the pinion, as shown in FIG. 4. Therefore, when a spool rotates idly, the spool shaft 5 can be rotated freely without being intervened from any components.

Figure 1A:
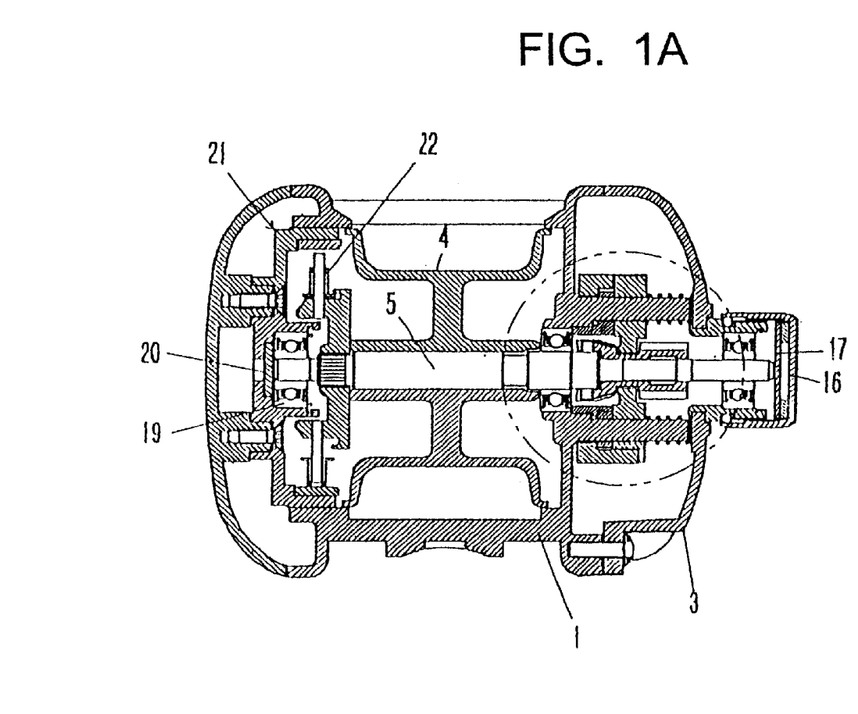
FIG. 1A is a cross-sectional view of a dual-bearing reel according to the invention.
Figure 1B:
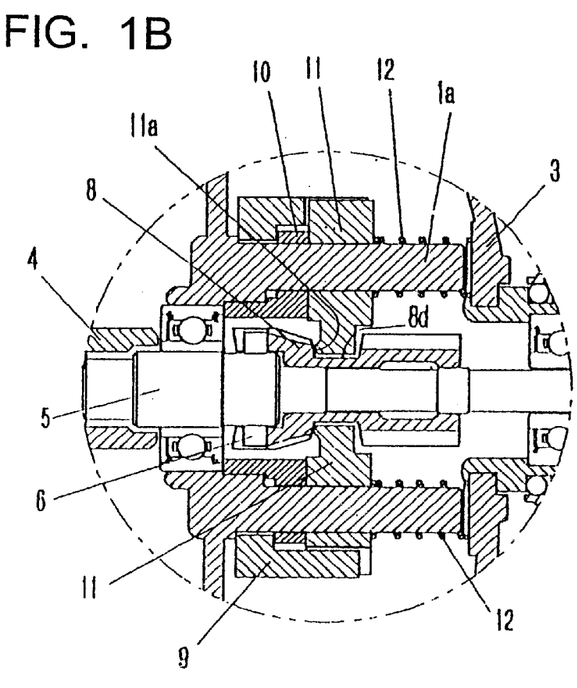
FIG. 1B is a magnified view of the spool of the reel in FIG. 1A.
Figure 2:
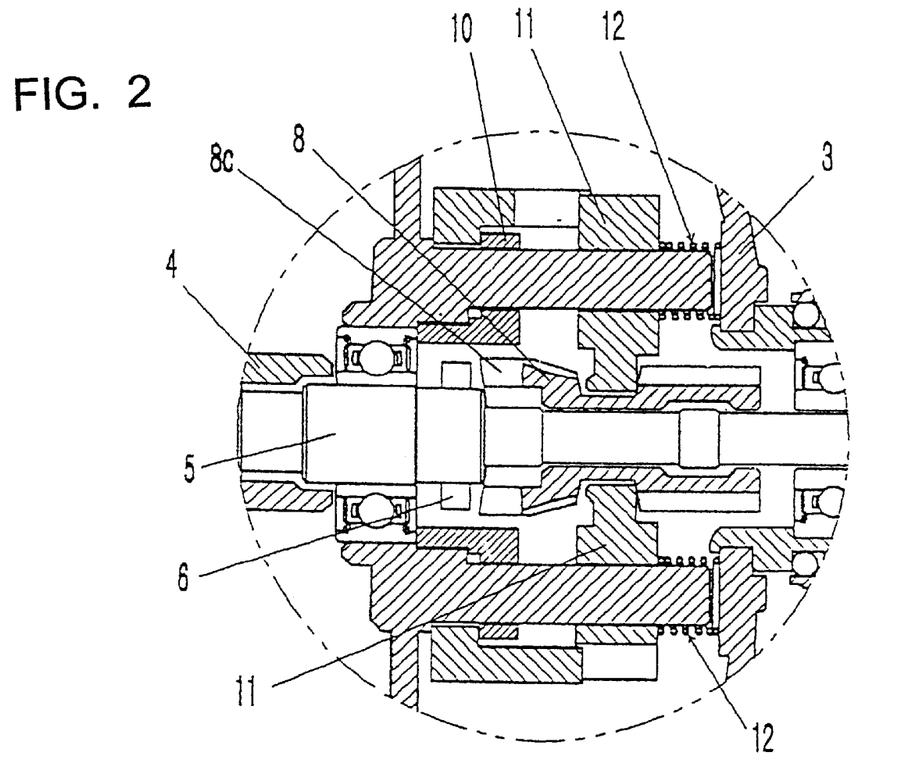
FIG. 2 is a cross-section view illustrating the state that a pinion is released from a spool shaft.

As shown in FIG. 2, when the pinion 8 is released from the spool shaft 5, however, any portion of the pinion 8 (the hole 8a) may be in contact with the spool shaft, due to a vibration, of which is generated when the spool rotates in a very high speed. Such a friction is a negligible value.

Figure 6:
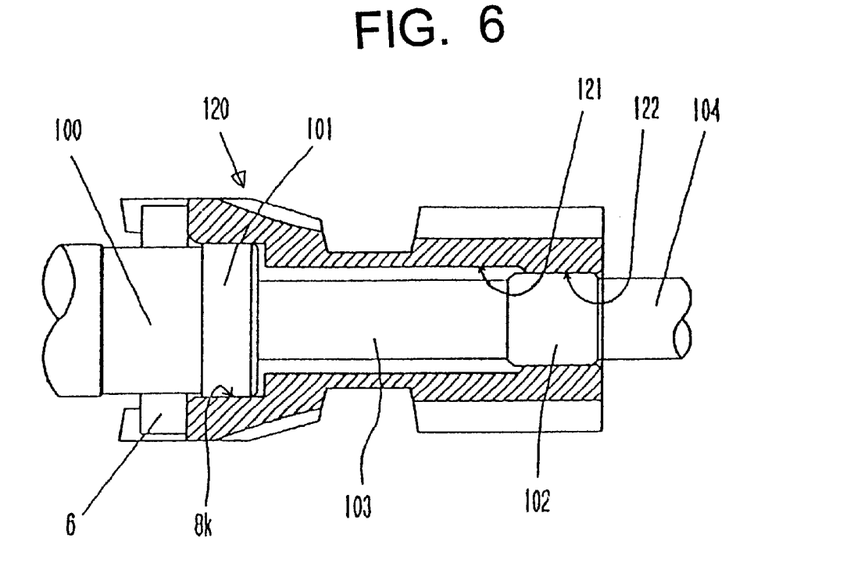
FIGS. 6 and 7 are enlarged views of an alternative embodiment of the present invention.
Figure 7:
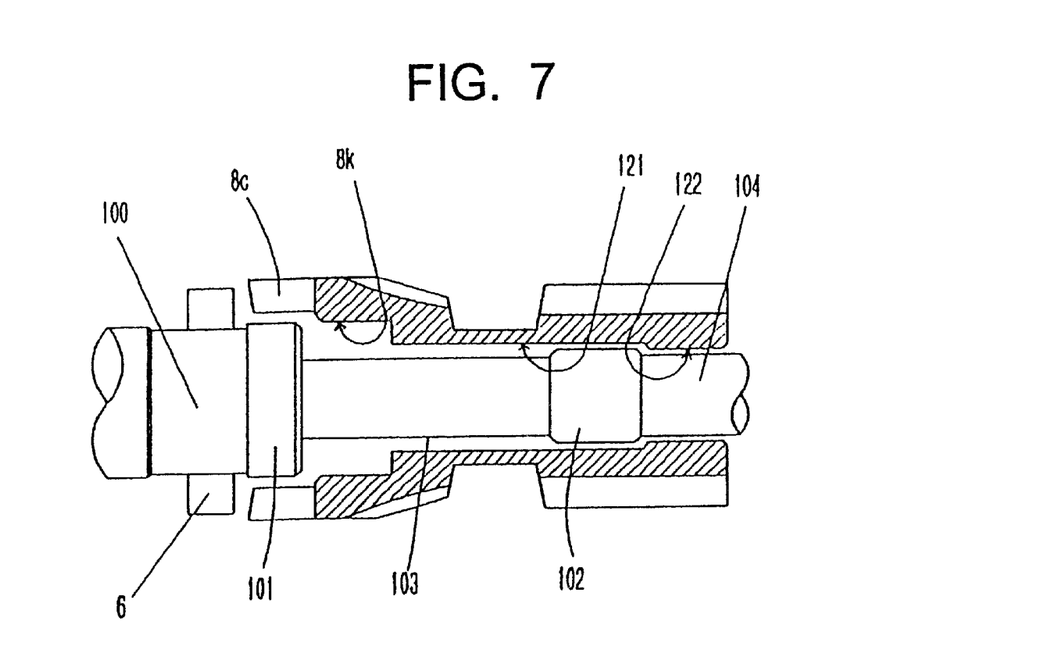

FIG. 6 illustrates an alternative preferred embodiment of the present invention. When a pinion 120 is engaged to a spool shaft 100, a hole 8k of a pinion is in contact with a stepped portion 101 of the spool shaft, and a stepped portion 102 is in contact with a hole 122 of the pinion. When the pinion is released from the spool shaft, the stepped portion 102 of the spool shaft is positioned in a hole 121 of the pinion, as shown in FIG. 7.

Figure 8:
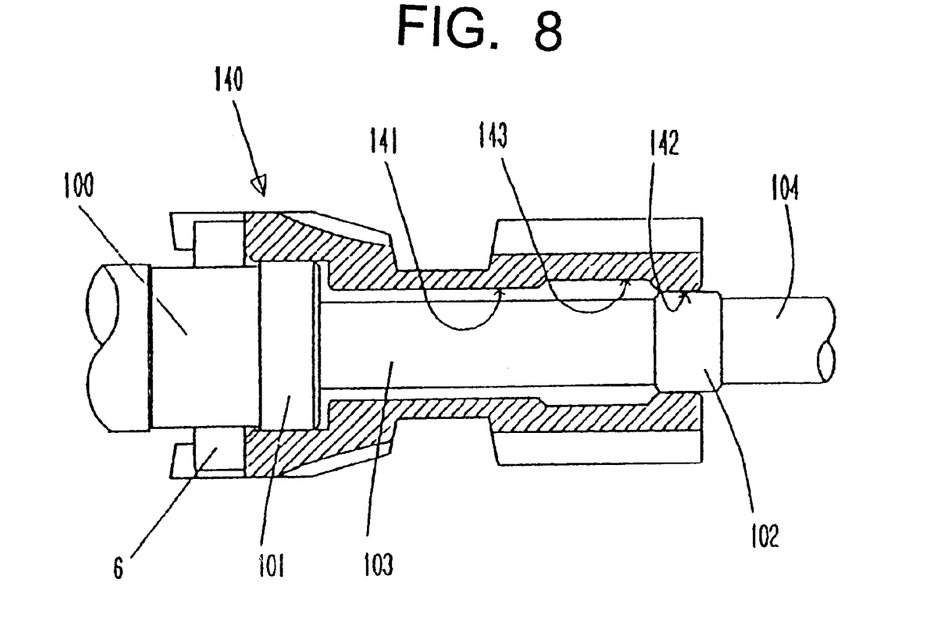
FIGS. 8 and 9 are enlarged views of other alternative embodiment of the present invention.
Figure 9:
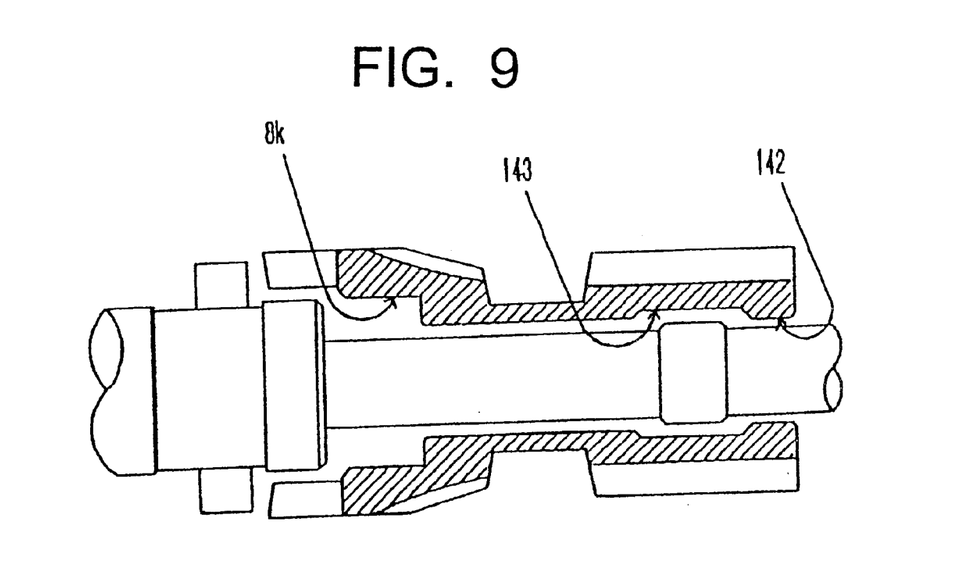

FIG. 8 illustrates other alternative preferred embodiment of the present invention. A hole 141 of a pinion is provided with an enlarged groove 143, in the embodiment of FIG. 6. When the pinion is released from the spool shaft, the stepped portion 102 of the spool shaft is positioned in the enlarged portion 143 of the pinion, and a hole 142 of the pinion is in contact with the stepped portion.

Figure 10:
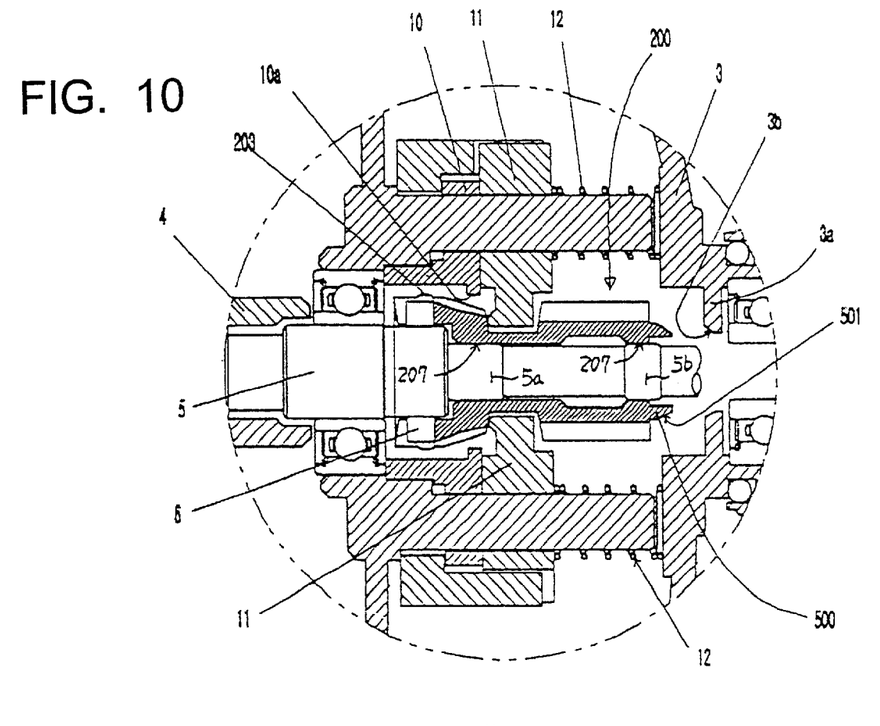
FIGS. 10 and 11 are enlarged views of another alternative embodiment of the present invention.
Figure 11:
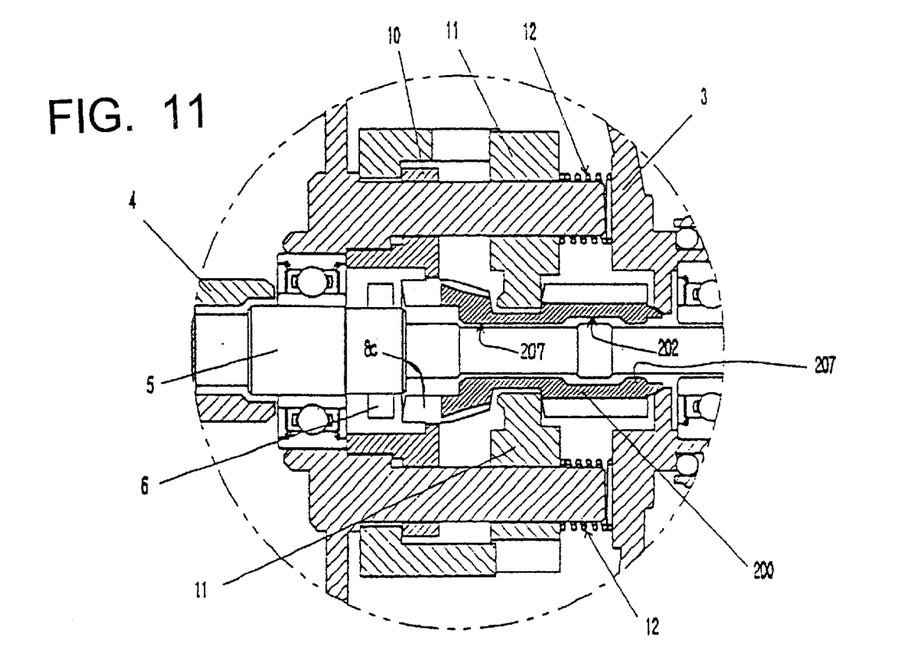

FIGS. 10 and 11 are enlarged views of another alternative preferred embodiment of the present invention. When a pinion 200 is released from a spool shaft 5, the spool shaft is not in contact with any portion of the pinion.

Specifically, a side cover 3 has a protruded annular portion 3a, and a slanted surface 3b on an inner flange thereof A hole of a cam plate 10 is provided with a stepped portion 10a. The pinion has an enlarged groove 202 on an inner surface of a hole 207, into which a large diameter portion 5a and a stepped portion 5b of the spool shaft are inserted, an annular boss 203 on one side of a pin latching groove, and a protruded arm 500 on the other side of the pin latching groove opposite to the annular boss 203. The protruded arm has a slanted surface 501 on an outer edge thereof.

When the pinion is engaged to the spool shaft, the large diameter portion 5a and stepped portion 5b of the spool shaft are in contact with the hole 207 of the pinion. When the pinion is released form the spool shaft, the annular boss 203 of the pinion is inserted into the stepped portion 10a of the cam plate 10, and the slanted surface 501 of the protruded arm 500 is the slanted surface 3b of the protruded annular portion 3a formed on the side cover 3, thereby automatically centering the slanted surfaces arm and significantly reducing the frictional coefficient between the spool shaft and the pinion. At that time, it is noted that the stepped portion 5b of the spool shaft is positioned in the groove 202 of the pinion. The pinion 200 is supported by means of the protruded annular portion 3a and the stepped portion 10a. In particular, the function of centering the slanted surfaces 501 and 3b causes the pinion to be prevented from the vibration, even though the spool is vibrated.

Figure 12:
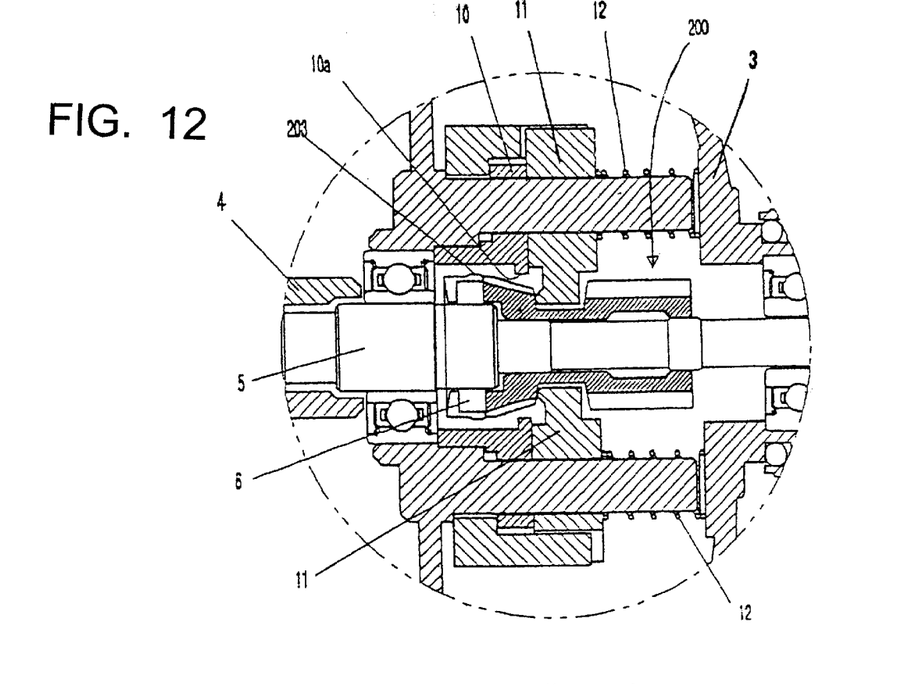
FIGS. 12 and 13 are enlarged views of still another alternative embodiment of the present invention.
Figure 13:
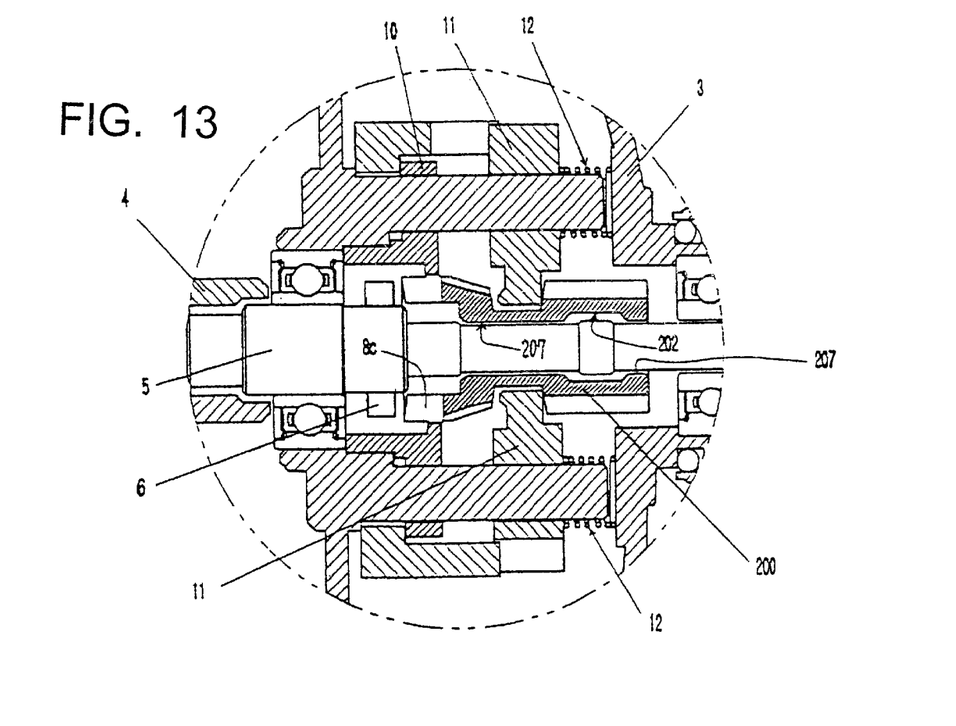

FIGS. 12 and 13 are enlarged views of still another alternative embodiment of the present invention, wherein the protruded annular portion 3a of the side cover and the protruded arm 500 of the pinion in the above embodiment are omitted, and wherein the construction causes the side cover to assemble.

Although the present invention has been described with reference to the drawings, it is understood that this description is not to limit the present invention to the embodiments shown in the drawings but simply to explain the present invention. One skilled in the art will understand that various changes and modifications can be made from the embodiments disclosed in the specification. Therefore, the scope of the present invention should be defined by the appended claims.

What is claimed is:

1. A dual-bearing reel comprising:
   a rotatable pinion having an inner periphery defining a hole and the pinion having an enlarged groove in the inner periphery;
   a handle;
   a gear train connected between the pinion and the handle for driving the pinion in the same direction when the handle is rotated; and
   a rotatable spool shaft having a large diameter portion, a stepped portion and a small diameter portion interposed between the large diameter portion and stepped portion, the spool shaft movable within the hole of the pinion such that when the large diameter portion and stepped portion are in contact with the inner periphery of the hole, the rotation of the pinion is translated to the spool shaft; and, when the stepped portion is positioned inside the enlarged groove in the pinion, the spool shaft is released from the pinion and the spool shaft is idly rotatable.

2. A dual-bearing reel comprising:
   a rotatable pinion having an inner periphery defining a first groove, a hole and an enlarged groove on the inner periphery of the hole;
   a handle;

a gear train connected between the pinion and the handle for driving the pinion in the same direction when the handle is rotated; and a rotatable spool shaft having first and second stepped portions and a small diameter portion interposed between the first and second stepped portions, the spool shaft movable within the hole of the pinion such that when the stepped portions are in contact with the inner periphery of the hole, the rotation of the pinion is translated to the spool shaft; and, when the second stepped portion is positioned inside the enlarged groove In the pinion, the spool shaft is released from the pinion and the spool shaft is idly rotatable.

3. A dual-bearing reel comprising:

a rotatable pinion having an inner periphery defining a hole and an enlarged groove on the inner periphery of the hole, the pinion further having an outer circumferential pin latching groove, an outer annular boss on one side of the pin latching groove and a protruded arm with a slanted surface on an outer edge located on the other side of the pin latching groove;

a handle;

a gear train connected between the pinion and the handle for driving the pinion in the same direction when the handle is rotated;

a cam plate having a stepped cam portion surrounding the pinion;

a side cover having a protruded annular portion; and a rotatable spool shaft having a large diameter portion, a stepped spool portion and a small diameter portion interposed between the large diameter portion and stepped spool portion, the spool shaft movably inserted within the hole of the pinion such that when the large diameter portion and stepped spool portion are in contact with the inner periphery of the hole, the rotation of the pinion is translated to the spool shaft; and, when the spool shaft is released from the pinion the annular boss of the pinion contacts the stepped cam portion of the cam plate, the slanted surface of the protruded arm contacts a correspondingly slanted surface of the protruded annular portion of the side cover, thereby automatically centering the pinion on the protruded annular portion of the side cover while the spool shaft is freely rotatable.

\* \* \* \* \*